(12) United States Patent
Shan et al.

(10) Patent No.: US 11,544,837 B2
(45) Date of Patent: Jan. 3, 2023

(54) METHOD FOR DYNAMICALLY MEASURING DEFORMATION OF ROTATING-BODY MOLD

(71) Applicant: Nanjing University of Aeronautics and Astronautics, Nanjing (CN)

(72) Inventors: Zhongde Shan, Nanjing (CN); Jun Wang, Nanjing (CN); Zhengyuan Wei, Nanjing (CN); Honghua Chen, Nanjing (CN); Qian Xie, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/574,843

(22) Filed: Jan. 13, 2022

(65) Prior Publication Data
US 2022/0198648 A1   Jun. 23, 2022

(51) Int. Cl.
*G06K 9/00* (2022.01)
*G06T 7/00* (2017.01)
(Continued)

(52) U.S. Cl.
CPC .......... *G06T 7/0004* (2013.01); *G01B 11/002* (2013.01); *G01B 11/16* (2013.01);
(Continued)

(58) Field of Classification Search
CPC ....... G06T 7/0002; G06T 7/0004; G06T 7/30; G06T 7/33; G06T 7/337; G06T 7/38;
(Continued)

(56) References Cited

U.S. PATENT DOCUMENTS 7,098,435 B2 *   8/2006   Mueller ................ G06T 7/55
                                              348/E13.016
7,327,857 B2 *   2/2008   Lloyd, Jr. .......... G01B 11/2522
                                                         382/154
(Continued)

FOREIGN PATENT DOCUMENTS

CN       101551238 A     10/2009
CN       101566461 A     10/2009
(Continued)

OTHER PUBLICATIONS

Jerome Sicard and Jayant Sirohi, "Measurement of the deformation of an extremely flexible rotor blade using digital image correlation", Measurement Science and Technology, vol. 24, No. 6, May 2013, pp. 1-10 (Year: 2013).*

(Continued)

*Primary Examiner* — Eric Rush
(74) *Attorney, Agent, or Firm* — Wayne IP LLC

(57) ABSTRACT

A method for dynamically measuring deformation of a rotating-body mold, including: (S1) subjecting an overall outer surface of the rotating-body mold to three-dimensional measurement to acquire an initial point cloud data; (S2) shooting, by a multi-camera system, the mold from different angles to obtain three-dimensional coordinates of marking points and coding points on the overall outer surface of the rotating-body mold; (S3) rotating the mold, and repeatedly photographing the marking points and the coding points on the mold surface under different angle poses; and calculating three-dimensional coordinates of the marking points and the coding points; and (S4) predicting a point cloud data of the outer surface under different angle poses based on a conversion relationship among the marking points to analyze a deformation degree of the mold during a rotation process.

5 Claims, 7 Drawing Sheets

(51) Int. Cl.
*G06T 7/55* (2017.01)
*G06T 7/70* (2017.01)
*G06V 10/74* (2022.01)
*G06V 10/75* (2022.01)
*G06V 10/24* (2022.01)
*G06V 10/10* (2022.01)
*G01B 11/16* (2006.01)
*G01B 11/00* (2006.01)

(52) U.S. Cl.
CPC ............. *G06T 7/55* (2017.01); *G06T 7/70* (2017.01); *G06T 7/97* (2017.01); *G06V 10/16* (2022.01); *G06V 10/19* (2022.01); *G06V 10/242* (2022.01); *G06V 10/754* (2022.01); *G06V 10/761* (2022.01); *G06T 2207/10028* (2013.01); *G06T 2207/30108* (2013.01); *G06T 2207/30116* (2013.01); *G06V 2201/12* (2022.01)

(58) Field of Classification Search
CPC .. G06T 7/50; G06T 7/55; G06T 7/593; G06T 7/596; G06T 7/60; G06T 7/70; G06T 7/73; G06T 7/74; G06T 7/97; G06T 2207/10016; G06T 2207/10021; G06T 2207/10028; G06T 2207/30108; G06T 2207/30116; G06T 2207/30164; G06V 10/16; G06V 10/19; G06V 10/24; G06V 10/242; G06V 10/245; G06V 10/44; G06V 10/751; G06V 10/754; G06V 10/757; G06V 10/761; G06V 2201/12; G01B 11/002; G01B 11/16; G01B 11/167; G01B 11/22; G01B 11/24; G01B 11/30; G01B 11/303; G01B 11/306; G01C 11/02; G01C 11/025; G01C 11/04; G01C 11/06; G01N 21/88; G01N 21/8803; G01N 21/89; G01N 21/8914; G01N 21/95; G01N 21/952
USPC ....... 382/100, 103, 106, 108, 141, 152, 154, 382/181, 195, 201, 203, 282, 285, 287, 382/291, 294, 325; 348/36, 42, 46–48, 348/86, 92–95, 125, 128, 135–137, 139, 348/142, 169; 702/1, 33–36, 81–84, 702/150–153, 167, 182, 183; 700/95, 700/109, 110, 117, 118, 175, 197, 204
See application file for complete search history.

(56) References Cited

U.S. PATENT DOCUMENTS 9,429,421 B2 *   8/2016   Kessler ................ G06T 7/0006
10,755,132 B2 *  8/2020   Li ....................... G06T 7/0002
2019/0197340 A1  6/2019   Li et al.

FOREIGN PATENT DOCUMENTS

| CN | 103743352 A | 4/2014 |
| CN | 107452024 A | 12/2017 |
| CN | 107966112 A | 4/2018 |
| CN | 111524238 A | 8/2020 |

OTHER PUBLICATIONS

Zhenzhong Xiao, Study on the Key Technologies of 3D Shape and Deformation Measurement Based on Industrial Photogrammetry and Computer Vision, "Chinese Excellent Doctoral and Master's Thesis Full-text Database (PhD) Information Technology Series". No. 07, pp. 68-80, Jul. 2012.

Shuo Li, Research on Key Technology Based on Line Structured Light Vision Measurement, "Chinese Excellent Doctoral and Master's Thesis Full-text Database (Master) Information Technology Series". No. 12, pp. 40-49, Dec. 2016.

Marco Scaioni et al. Image-based deformation measurement. "Applied Geomatics". 2015.

Lianpo Wang et al. Deformation measurement of high-speed rotating drone blades based on digital image correlation combined with ring projection transform and orientation codes, "Measurement". 2019.

* cited by examiner

METHOD FOR DYNAMICALLY MEASURING DEFORMATION OF ROTATING-BODY MOLD

CROSS-REFERENCE TO RELATED APPLICATIONS

This application claims the benefit of priority from Chinese Patent Application No. 202110181635.6, filed on Feb. 10, 2021. The content of the aforementioned application, including any intervening amendments thereto, is incorporated herein by reference in its entirety.

TECHNICAL FIELD

This application relates to three-dimensional point cloud detection, and more particularly to a method for dynamically measuring deformation of a rotating-body mold.

BACKGROUND

In recent years, with the development of digital technology, the digital measurement and detection technology has been extensively applied in aeronautical manufacturing due to its high precision and excellent efficiency. With the increase of mold size and surface complexity, traditional detection methods can no longer meet the current detection requirements. The 3D laser scanner and the digital close-range industrial photogrammetric system are utilized to obtain the surface data of the mold, which is analyzed using a computer vision-related algorithm to calculate the three-dimensional coordinates of points on the object to be measured, providing technical approaches for efficient digital dynamic detection of large-size composite forming molds. During this process, the digital close-range industrial photogrammetric system can effectively compensate for the drawback of the 3D laser scanner that it fails to obtain the 3D coordinates of the large-size molds in a moving state. By means of the combination of the 3D laser scanner and the photogrammetric system, the fast and accurate digital measurement for large-size molding molds is enabled.

The large-size composite components applied in aircraft manufacturing and assembly generally have complex shape and special structure, and require high rigidity and internal surface quality. Generally, these components are manufactured via integrated fiber placement. A superior-quality forming tooling can effectively improve the profile accuracy of the composite component. However, during the actual rotational fiber placement of composite components, the surface of the large-size rotating body mold is prone to deformation due to its weight, resulting in the profile deviation of the final molded composite components. As a result, how to dynamically detect the deformation of the composite molding molds has become vital for ensuring the quality of composite components.

SUMMARY

An objective of this application is to provide a method for dynamically measuring deformation of a rotating-body mold to solve the problems existing in the prior art.

Technical solutions of this application are described as follows.

This application provides a method for dynamically measuring deformation of a rotating-body mold, comprising:

(S1) subjecting an overall outer surface of the rotating-body mold to three-dimensional measurement to acquire an initial point cloud data;

(S2) shooting, by a multi-camera system, the rotating-body mold from different angles to obtain three-dimensional coordinates of marking points and three-dimensional coordinates of coding points on the overall outer surface of the rotating-body mold;

(S3) rotating the rotating-body mold, and repeatedly photographing the marking points and the coding points on the mold surface under different angle poses; and calculating the three-dimensional coordinates of the marking points and the three-dimensional coordinates of the coding points; and (S4) predicting a point cloud data of the outer surface under different angle poses based on a conversion relationship among the marking points to analyze a deformation degree of the rotating-body mold during a rotation process.

In an embodiment, the step (S1) is performed through steps of:

(S11) pasting the coding points on the mold surface and cylindrical surfaces of chucks on both sides of the rotating-body mold at a certain density, and pasting the marking points randomly on the mold surface; wherein the coding points are configured for construction of a global coordinate system and a data alignment reference; and the marking points are configured for sampling increase and subsequent conversion and calculation of a surface data;

(S12) placing a reference ruler and a benchmark; taking multiple sets of overlapping photos using MaxShot, and performing three-dimensional calculation of the coding points via image triangulation to establish a measurement coordinate system; and (S13) measuring a three-dimensional point cloud data $P_1=\{p_1, p_2, \ldots, p_m\}$ of the overall outer surface of the rotating-body mold through binocular C-Track transformation using MetraScan.

In an embodiment, the step (S2) is performed through steps of:

(S21) planning a plurality of stations for photogrammetry followed by photographing; wherein each of the plurality of stations is configured to contain as many marking points as possible; and adjacent stations are configured to contain at least four common marking points;

(S22) recognizing coding marks in images respectively taken in the plurality of stations;

(S23) subjecting images with the same coding mark to matching; unifying the images into a photogrammetric coordinate system using the coding marks; and obtaining an exterior orientation element of each image;

(S24) based on known exterior orientation elements of the images, subjecting other non-coding mark points to correspondence points matching using an epipolar matching method; and (S25) calculating the three-dimensional coordinates of the marking points through bundle adjustment to obtain data $t_1=\{t_{1\_1}, t_{2\_1}, \ldots, t_{n\_1}\}$ of a total of n marking points in a first pose.

In an embodiment, the step (S3) is performed through:

rotating the rotating-body mold, and repeating the step (S2) to shoot and calculate marking point data $t_2=\{t_{1\_2}, t_{2\_2}, \ldots, t_{n\_2}\}, \ldots, t_i=\{t_{1\_i}, t_{2\_i}, \ldots, t_{n\_i}\}$ under different angle poses, wherein i is the number of poses corresponding to a rotation angle.

In an embodiment, the step (S4) is performed through steps of:

(S41) based on a rigid-body transformation of coding points on a chuck, unifying marking point data under multiple angles into the same coordinate system;

(S42) calculating a transformation relationship between marking points adjacent to outer surface points under multiple angle poses to reversely obtain a three-dimensional coordinate of the outer surface under a corresponding pose; and (S43) analyzing the deformation degree of the rotating-body mold during the rotation process based on three-dimensional coordinates of the outer surface under multiple angle poses.

In an embodiment, the step (S41) is performed through steps of:

(S411) recognizing the coding points on cylindrical surfaces of chucks on both sides in a captured image; and (S412) taking marking point data $t_1=\{t_{1\_1}, t_{2\_1}, \ldots, t_{n\_1}\}$ measured for the first time as a reference to calculate a rotation matrix among the coordinates of the coding points with the same serial number; and subjecting data obtained under different angle poses to alignment; wherein the marking point data after alignment are
$s_1=\{s_{1\_1}, s_{2\_1}, \ldots, s_{n\_1}\}$,
$s_2=\{s_{1\_2}, s_{2\_2}, \ldots, s_{n\_2}\}, \ldots, s_i=\{s_{1\_i}, s_{2\_i}, \ldots, s_{n\_i}\}$; and
$s_1=t_1$.

In an embodiment, the step (S42) is performed through steps of:

(S421) finding k neighboring marking points $\{(s_{1\_1}, s_{2\_1}, \ldots, s_{k\_1}), (s_{1\_2}, s_{2\_2}, \ldots, s_{k\_2}), \ldots, (s_{1\_i}, s_{2\_i}, \ldots, s_{k\_i})\}$ of outer surface points $p_j$ in an initial station in a marking point data set $\{s_1, s_2, \ldots, s_i\}$;

(S422) calculating three-dimensional coordinates of points on the outer surface of the rotating-body mold at a second station, expressed as $p_{j\_2}=p_{j\_1}+(\theta_1(s_{1\_2}-s_{1\_1})+\theta_2(s_{2\_2}-s_{2\_1})+\ldots+\theta_k(s_{k\_2}-s_{k\_1}))/k$; wherein $\theta_k$ is a weight of each neighboring marking point; and the closer a marking point is to $p_{j\_1}$, the greater its weight is; and (S423) repeating the step (S422) to calculate a three-dimensional coordinate set $P_1, P_2, \ldots, P_i$ of the outer surface under multiple angle poses.

In an embodiment, the step (S43) is performed through steps of:

(S431) calculating a distance between surface points of adjacent stations, wherein a distance between $P_1$ and $P_2$ is $d_1$, a distance between $P_2$ and $P_3$ is $d_2$, and so on, and a distance between $P_{i\_1}$ and $P_i$ is $d_{i-1}$; and a distance array is expressed as $d=\{d_1, d_2, \ldots, d_{i-1}\}$; and (S432) calculating an average value and a variance of the distance array $d=\{d_1, d_2, \ldots, d_{i-1}\}$ to evaluate the deformation degree of the rotating-body mold.

Compared with the prior art, this application has the following beneficial effects.

The method provided herein innovatively adopts photogrammetry to measure the coding points and marking points on the surface of the large-size composite forming mold to reversely obtain the three-dimensional coordinates of the outer surface of the mold under different poses for analysis, so as to finally obtain the deformation degree of the large-size rotating-body mold. This technique can effectively analyze the deformation error during the rotation process of large-size molds, and provides technical reference for the subsequent processing of composite components, facilitating improving the final molding quality.

DETAILED DESCRIPTION OF EMBODIMENTS

This application will be described in detail below with reference to the accompanying drawings and embodiments.

Figure 1:
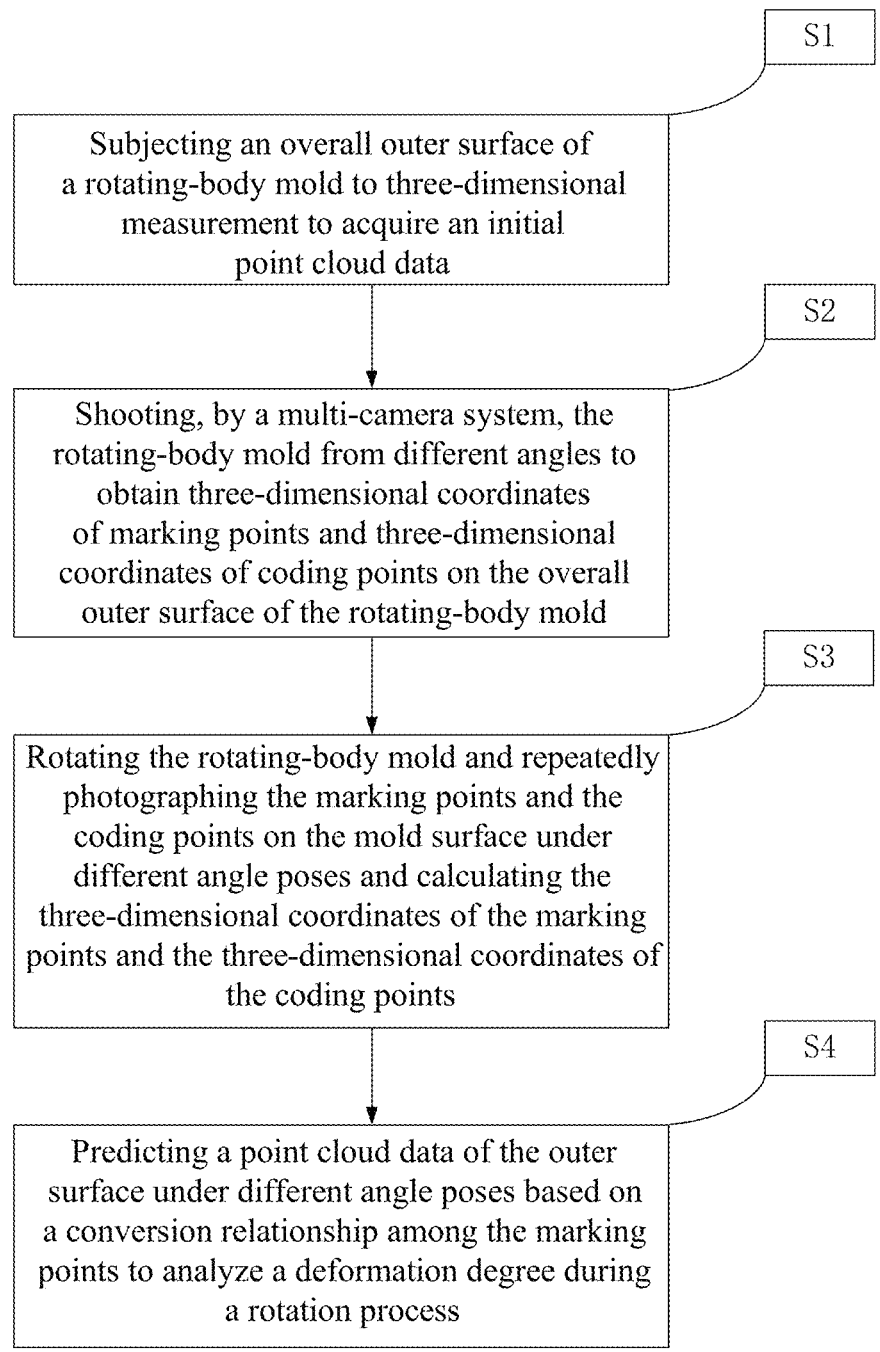
FIG. 1 is flowchart of a method for dynamically measuring deformation of a rotating-body mold according to an embodiment of the present disclosure.
Figure 4:
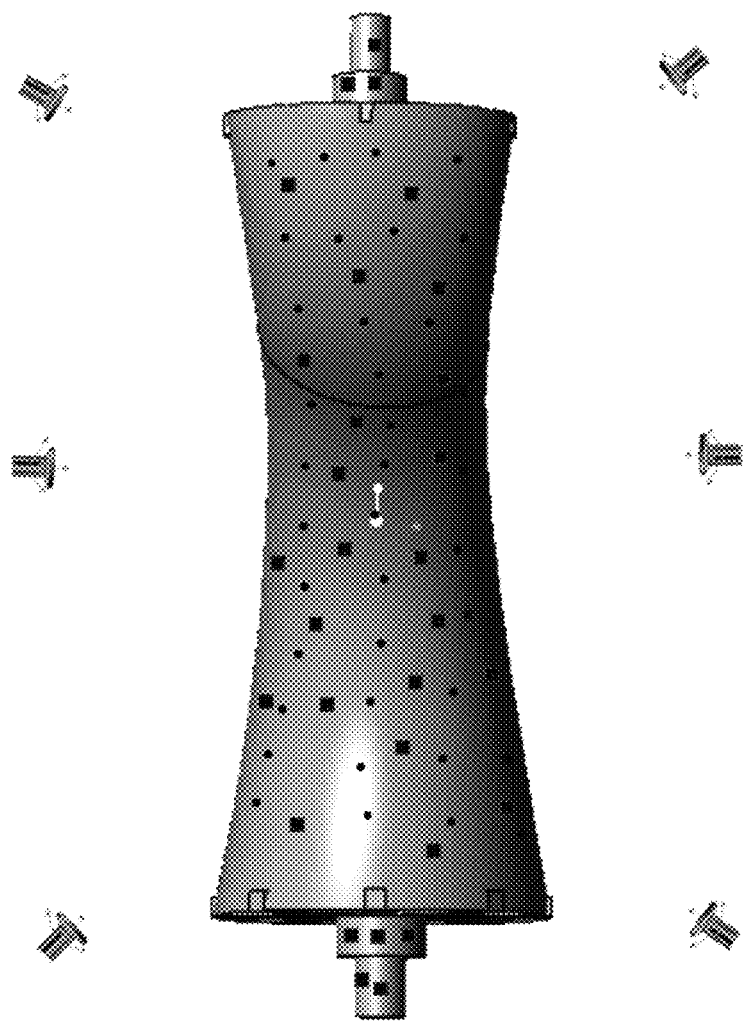
FIG. 4 is a schematic diagram of a rotating-body mold according to an embodiment of the present disclosure.

To measure a surface of the mold and analyze the influence of its deformation on the forming of composite components, this disclosure provides a method for dynamically measuring and analyzing deformation of a rotating-body mold (as shown in FIG. 4), which is mainly shown in FIG. 1.

This disclosure provides a method for dynamically measuring deformation of a large-size rotating-body mold, which includes the following steps.

(S1) An overall outer surface of the rotating-body mold is subjected to three-dimensional measurement to acquire an initial point cloud data.

(S2) A multi-camera system shoots the rotating-body mold from different angles to obtain three-dimensional coordinates of marking points and three-dimensional coordinates of coding points on the overall outer surface of the rotating-body mold.

(S3) The rotating-body mold is rotated and the marking points and the coding points on the mold surface under different angle poses are repeatedly photographed, and then the three-dimensional coordinates of the marking points and the three-dimensional coordinates of the coding points are calculated.

(S4) A point cloud data of the outer surface under different angle poses is predicted based on a conversion relationship among the marking points to analyze a deformation degree of the rotating-body mold during a rotation process.

The application of the technical solutions provided herein can effectively realize the dynamic measurement and deformation analysis of the rotating-body mold.

Figure 2:
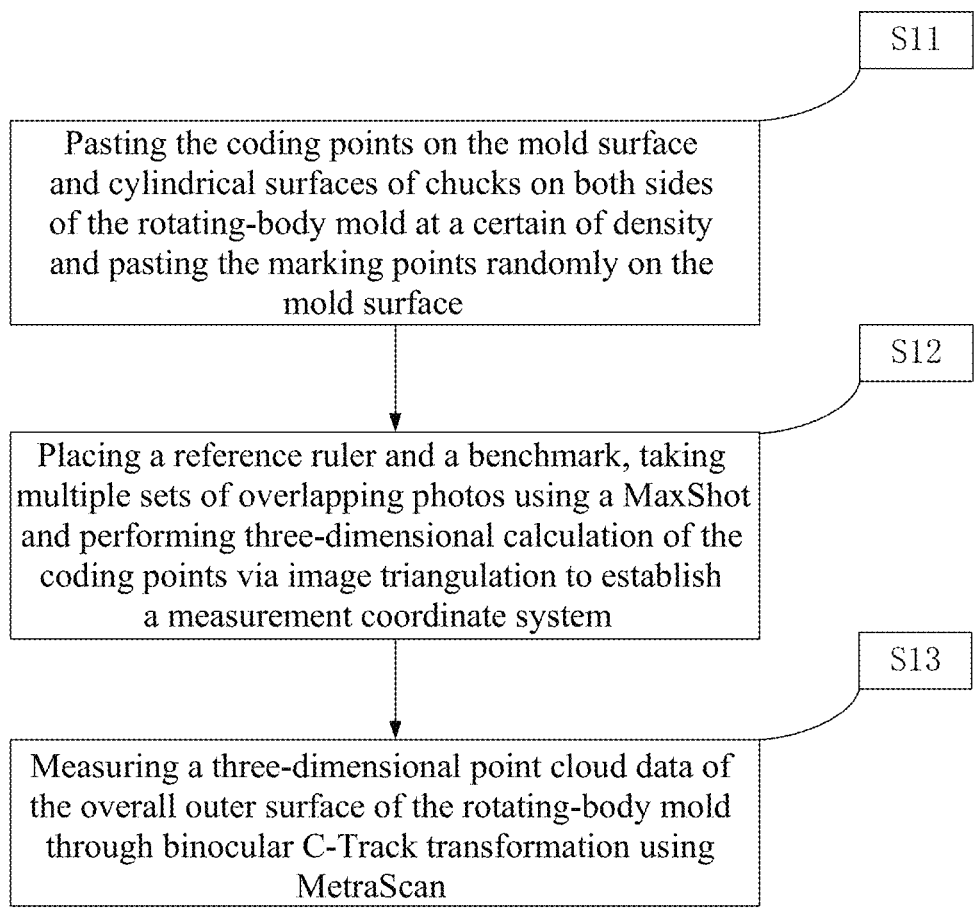
FIG. 2 is a flowchart of step (S1) according to an embodiment of the present disclosure.

In this embodiment, as shown in FIG. 2, the step (S1) is performed through the following steps.

(S11) The coding points are pasted on the mold surface and cylindrical surfaces of chucks on both sides of the rotating-body mold at a certain density. The marking points are randomly pasted on the mold surface, where the coding points are configured for construction of a global coordinate system and a data alignment reference and the marking points are configured for sampling increase and subsequent conversion and calculation of a surface data.

(S12) A reference ruler and a benchmark are placed. Multiple sets of overlapping photos are taken using MaxShot. Three-dimensional calculation of the coding points is performed via image triangulation to establish a measurement coordinate system.

(S13) A three-dimensional point cloud data $P_1=\{p_1, p_2, \ldots, p_m\}$ of the overall outer surface of the rotating-body mold is measured through binocular C-Track transformation using MetraScan.

Figure 3:
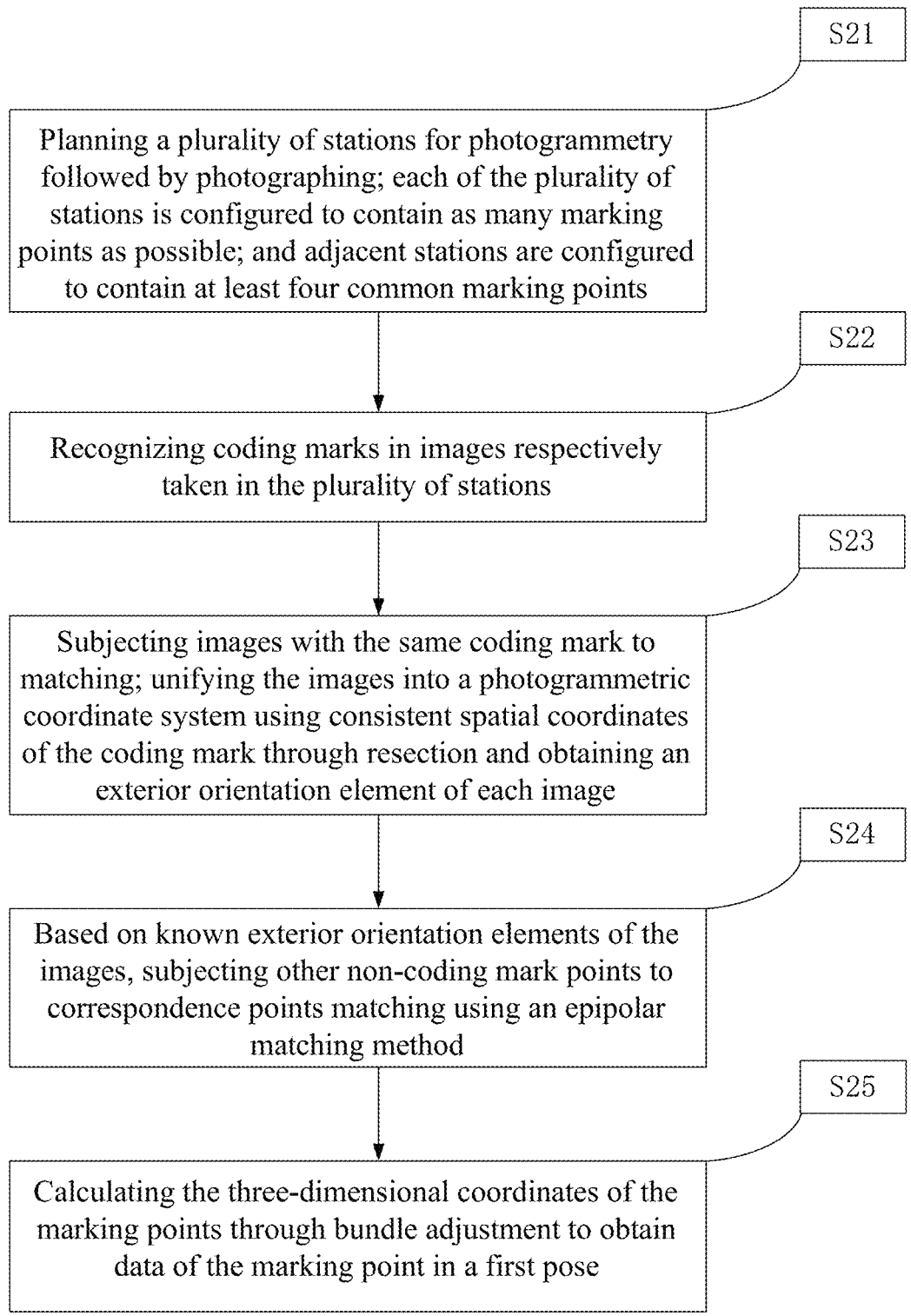
FIG. 3 is a flowchart of step (S2) according to an embodiment of the present disclosure.

In this embodiment, as shown in FIG. 3, the step (S2) includes the following steps.

(S21) A plurality of stations are planned for photogrammetry followed by photographing, where each of the plurality of stations is configured to contain as many marking points as possible. Adjacent stations are configured to contain at least four common marking points.

(S22) Coding marks in images respectively taken in the plurality of stations are recognized.

(S23) Images with the same coding mark are subjected to matching. The images are unified into a photogrammetric coordinate system using the coding marks. An exterior orientation element of each image is obtained.

(S24) Based on known exterior orientation elements of the images, Other non-coding mark points are subjected to correspondence points matching using an epipolar matching method.

(S25) The three-dimensional coordinates of the marking points are calculated through bundle adjustment to obtain data $t_1=\{t_{1\_1}, t_{2\_1}, \ldots, t_{n\_1}\}$ of a total of n marking points in a first pose.

In this embodiment, the step (S3) is performed through the following step.

The rotating-body mold is rotated and the step (S2) is repeated to shoot and calculate marking point data $t_2=\{t_{1\_2}, t_{2\_2}, \ldots, t_{n\_2}\}, \ldots, t_i=\{t_{1\_i}, t_{2\_i}, \ldots, t_{n\_i}\}$ under different angle poses, where i is the number of poses corresponding to a rotation angle.

Figure 5:
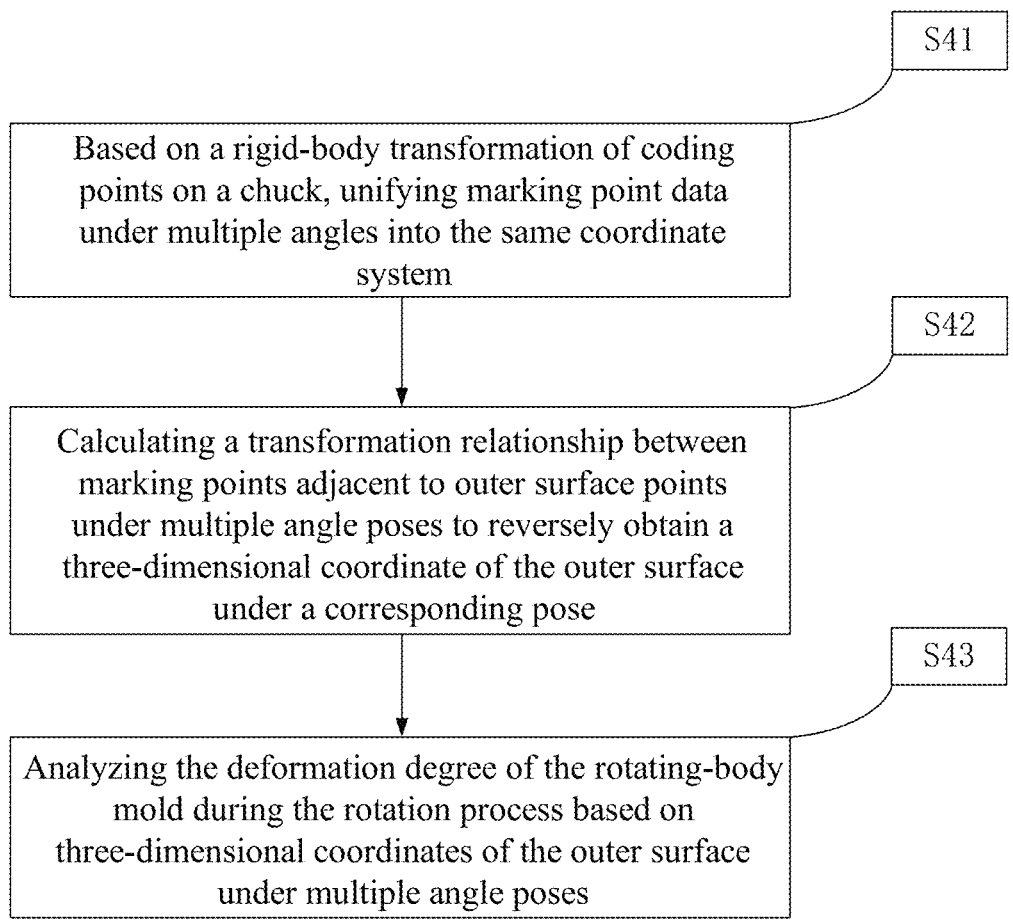
FIG. 5 is a flowchart of step (S4) according to an embodiment of the present disclosure.

In this embodiment, as shown in FIG. 5, the step (S4) is performed through the following steps.

(S41) Based on a rigid-body transformation of coding points on a chuck, marking point data is unified under multiple angles into the same coordinate system.

(S42) A transformation relationship between marking points adjacent to outer surface points under multiple angle poses is calculated to reversely obtain a three-dimensional coordinate of the outer surface under a corresponding pose.

(S43) The deformation degree of the rotating-body mold is analyzed during the rotation process based on three-dimensional coordinates of the outer surface under multiple angle poses.

Figure 6:
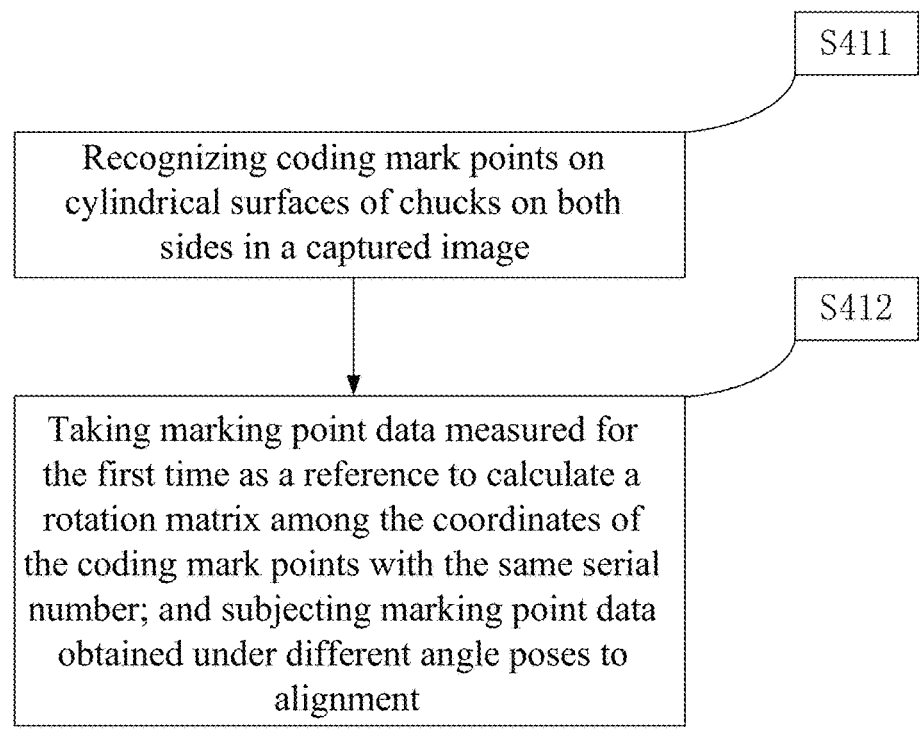
FIG. 6 is a flowchart of step (S41) according to an embodiment of the present disclosure.

In this embodiment, as shown in FIG. 6, the step (S41) is performed through the following steps.

(S411) The coding points on cylindrical surfaces of chucks on both sides are recognized in a captured image.

(S412) Marking point data $t_1=\{t_{1\_1}, t_{2\_1}, \ldots, t_{n\_1}\}$ measured for the first time is taken as a reference to calculate a rotation matrix among coordinates of the coding points with the same serial number. The data obtained under different angle poses is subjected to alignment, where the marking point data after alignment are
$s_1=\{s_{1\_1}, s_{2\_1}, \ldots, s_{n\_1}\}$,
$s_2=\{s_{1\_2}, s_{2\_2}, \ldots, s_{n\_2}\}, \ldots, s_i=\{s_{1\_i}, s_{2\_i}, \ldots, s_{n\_i}\}$; and
$s_1=t_1$.

Figure 7:
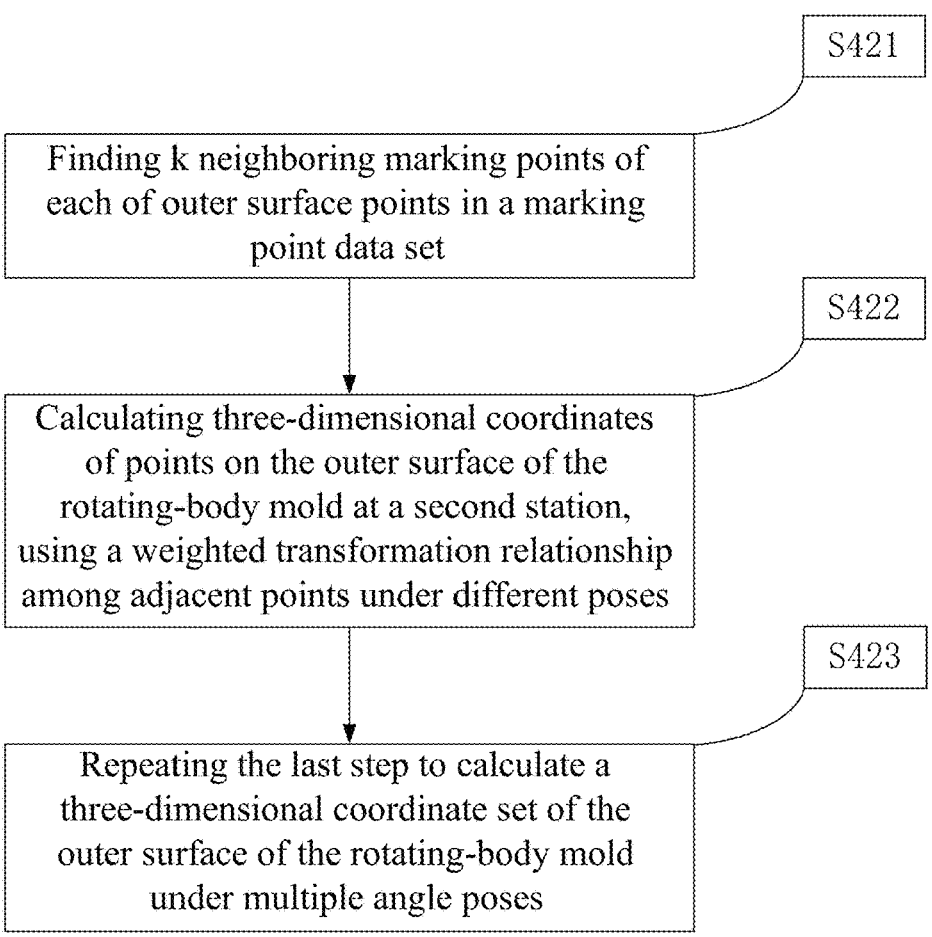
FIG. 7 is a flowchart of step (S42) according to an embodiment of the present disclosure.

In this embodiment, as shown in FIG. 7, the step (S42) is performed through the following steps.

(S421) k neighboring marking points $\{(s_{1\_1}, s_{2\_1}, \ldots, s_{k\_1}), (s_{1\_2}, s_{2\_2}, \ldots, s_{k\_2}), \ldots, (s_{1\_i}, s_{2\_i}, \ldots, s_{k\_i})\}$ of outer surface points $p_j$ in an initial station in a marking point data set $\{s_1, s_2, \ldots, s_i\}$ are found.

(S422) Three-dimensional coordinates of points on the outer surface of the rotating-body mold at a second station is calculated, expressed as $p_{j\_2}=p_{j\_1}+(\theta_1(s_{1\_2}-s_{1\_1})+\theta_2(s_{2\_2}-s_{2\_1})+ \ldots +\theta_k(s_{k\_2}-s_{k\_1}))/k$, where $\theta_k$ is a weight of each neighboring marking point. The closer the marking point is to $p_{j\_1}$, the greater its weight is.

(S423) The step (S422) is repeated to calculate a three-dimensional coordinate set $P_1, P_2, \ldots, P_i$ of the outer surface under multiple angle poses.

Figure 8:
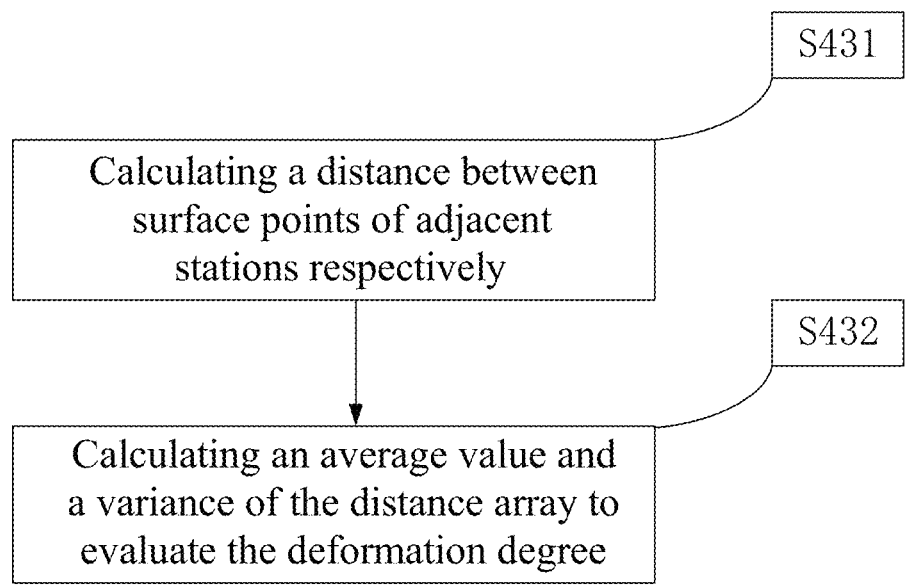
FIG. 8 is a flowchart of step (S43) according to an embodiment of the present disclosure.

In this embodiment, as shown in FIG. 8, the step (S43) is performed through the following steps.

(S431) A distance between surface points of adjacent stations is calculated, where a distance between $P_1$ and $P_2$ is $d_1$, a distance between $P_2$ and $P_3$ is $d_2$, and so on, and a distance between $P_{i-1}$ and $P_i$ is $d_{i-1}$. A distance array is expressed as $d=\{d_1, d_2, \ldots, d_{i-1}\}$.

(S432) An average value and a variance of the distance array $d=\{d_1, d_2, \ldots, d_{i-1}\}$ are calculated to evaluate the deformation degree of the rotating-body mold.

Described above are merely preferred embodiments of the disclosure, which are not intended to limit the scope of the application. It should be understood that any replacements, modifications and changes made by those skilled in the art without departing from the spirit of this application shall fall within the scope of this application defined by the appended claims.

What is claimed is:

1. A method for dynamically measuring deformation of a rotating-body mold, comprising:
   (S1) subjecting an overall outer surface of the rotating-body mold to three-dimensional measurement to acquire an initial point cloud data;
   (S2) shooting, by a multi-camera system, the rotating-body mold from different angles to obtain three-dimensional coordinates of marking points and three-dimensional coordinates of coding points on the overall outer surface of the rotating-body mold;
   (S3) rotating the rotating-body mold, and repeatedly photographing the marking points and the coding points on the overall outer surface under different angle poses; and respectively calculating three-dimensional coordinates of the marking points and three-dimensional coordinates of the coding points under different angle poses; and
   (S4) predicting point cloud data of the overall outer surface under different angle poses based on a conversion relationship among the marking points to analyze a deformation degree of the rotating-body mold during a rotation process;
   wherein the step (S2) is performed through steps of:
   (S21) planning a plurality of stations for photogrammetry followed by photographing; wherein each of the plurality of stations is configured to contain as many of the marking points as possible; and adjacent stations are configured to contain at least four common marking points;
   (S22) recognizing coding marks in images respectively taken in the plurality of stations;
   (S23) subjecting images with common coding marks to matching; unifying the images respectively taken in the plurality of stations into a photogrammetric coordinate system using the coding marks; and obtaining an exterior orientation element of each image;
   (S24) based on known exterior orientation elements of the images respectively taken in the plurality of stations, subjecting other non-coding mark points to correspondence points matching using an epipolar matching method; and (S25) calculating the three-dimensional coordinates of the marking points through bundle adjustment to obtain marking point data $t_1=\{t_{1\_1}, t_{2\_1}, \ldots, t_{n\_1}\}$ of a total of n marking points in a first pose;

wherein the step (S4) is performed through steps of:

(S41) based on a rigid-body transformation of coding points on a chuck, unifying marking point data obtained under multiple angle poses into a common coordinate system;

(S42) calculating a transformation relationship between marking points adjacent to outer surface points under multiple angle poses to reversely obtain a three-dimensional coordinate set $P_1, P_2, \ldots, P_i$ of the overall outer surface under a corresponding pose, wherein i is a number of poses corresponding to a rotation angle; and (S43) analyzing the deformation degree of the rotating-body mold during the rotation process based on three-dimensional coordinates of the overall outer surface under multiple angle poses;

wherein the step (S43) is performed through steps of:

(S431) calculating a distance between surface points of adjacent stations, wherein a distance between $P_1$ and $P_2$ is $d_1$, a distance between $P_2$ and $P_3$ is $d_2$, and so on, and a distance between $P_{i-1}$ and $P_i$ is $d_{i-1}$; and a distance array is expressed as $d=\{d_1, d_2, \ldots, d_{i-1}\}$; and (S432) calculating an average value and a variance of the distance array $d=\{d_1, d_2, \ldots, d_{i-1}\}$ to evaluate the deformation degree of the rotating-body mold.

2. The method of claim 1, wherein the step (S1) is performed through steps of:

(S11) pasting the coding points on the overall outer surface and cylindrical surfaces of chucks on both sides of the rotating-body mold at a certain density, and pasting the marking points randomly on the overall outer surface; wherein the coding points are configured for construction of a global coordinate system and a data alignment reference; and the marking points are configured for sampling increase and subsequent conversion and calculation of a surface data;

(S12) placing a reference ruler and a benchmark; taking multiple sets of overlapping photos using MaxShot, and performing three-dimensional calculation of the coding points via image triangulation to establish a measurement coordinate system; and (S13) measuring three-dimensional point cloud data $P_1=\{p_1, p_2, \ldots, p_m\}$ of the overall outer surface of the rotating-body mold through binocular C-Track transformation using MetraScan.

3. The method of claim 1, wherein the step (S3) is performed through steps of:

rotating the rotating-body mold, and repeating the step (S2) to shoot and calculate marking point data $t_2=\{t_{1\_2}, t_{2\_2}, \ldots, t_{n\_2}\}, \ldots, t_i=\{t_{1\_i}, t_{2\_i}, \ldots, t_{n\_i}\}$ under different angle poses, wherein i is the number of poses corresponding to a rotation angle.

4. The method of claim 1, wherein the step (S41) is performed through steps of:

(S411) recognizing coding points on cylindrical surfaces of chucks on both sides of the rotating-body mold in a captured image; and (S412) taking the marking point data $t_1=\{t_{1\_1}, t_{2\_1}, \ldots, t_{n\_1}\}$ measured for the first pose as a reference to calculate a rotation matrix among coordinates of coding points with a same serial number; and subjecting the marking point data obtained under multiple angle poses to alignment; wherein the marking point data after alignment are $s_1=\{s_{1\_1}, s_{2\_1}, \ldots, s_{n\_1}\}, s_2=\{s_{1\_2}, s_{2\_2}, \ldots, s_{n\_2}\}, \ldots, s_i=\{s_{1\_i}, s_{2\_i}, \ldots, s_{n\_i}\}$; and $s_1=t_1$.

5. The method of claim 1, wherein the step (S42) is performed throughs steps of:

(S421) finding k neighboring marking points $\{(s_{1\_1}, s_{2\_1}, \ldots, s_{k\_1}), (s_{1\_2}, s_{2\_2}, \ldots, s_{k\_2}), \ldots, (s_{1\_i}, s_{2\_i}, \ldots, s_{k\_i})\}$ of outer surface points $p_j$ in an initial station in a marking point data set $\{s_1, s_2, \ldots, s_i\}$;

(S422) calculating three-dimensional coordinates of points on the overall outer surface of the rotating-body mold at a second station, expressed as $p_{j\_2}=p_{j\_1}+(\theta_1(s_{1\_2}-s_{1\_1})+\theta_2(s_{2\_2}-s_{2\_1})+ \ldots +\theta_k(s_{k\_2}-s_{k\_1}))/k$; wherein $\theta_k$ is a weight of each neighboring marking point; and the closer a marking point is to $p_{j\_1}$, the greater its weight is; and (S423) repeating the step (S422) to calculate a three-dimensional coordinate set $P_1, P_2, \ldots, P_i$ of the overall outer surface under multiple angle poses.

\* \* \* \* \*